United States Patent
Becker et al.

[15] 3,672,316
[45] June 27, 1972

[54] APPARATUS FOR JOINT CONTROL OF A CLUTCH AND ELECTRICAL SWITCHES

[72] Inventors: Ernst Becker; Karl Notz, both of Darmstadt, Germany

[73] Assignee: Quick-Elektromotoren-Werk GmbH, Darmstadt, Germany

[22] Filed: Jan. 27, 1967

[21] Appl. No.: 612,129

[30] Foreign Application Priority Data

Jan. 28, 1966 Germany ..................P 15 38 049.1

[52] U.S. Cl. ..........................................112/219 A, 192/148
[51] Int. Cl. ......................................................D05b 69/00
[58] Field of Search ..................112/219 A, 219, 220, 67, 87; 192/148, 146, 144, 18.2

[56] References Cited

UNITED STATES PATENTS

| | | | |
|---|---|---|---|
| 2,942,564 | 6/1960 | Larys et al. | 112/219 A |
| 3,174,450 | 3/1965 | Becker et al. | 112/219 A |
| 3,237,579 | 1/1966 | Medynski et al. | 112/219 A |
| 3,267,895 | 8/1966 | Akerley et al. | 112/219 |

*Primary Examiner*—H. Hampton Hunter
*Attorney*—Otto John Munz

[57] ABSTRACT

An apparatus for operating a clutch mechanism and automatically and mechanically therewith a plurality of switches for control of additional motors.

Two mechanical tie rods, one linked with its outer end to the clutch, the other operated by external power application upon its opposite outer end, engage electrical switches, which are mechanically connected with them for automatic selectively preset time-spaced motive operations of the clutch and the switches with a precalculated lost motion of the switch operations.

11 Claims, 5 Drawing Figures

INVENTORS
Ernst Becker &
Karl Notz

3,672,316

APPARATUS FOR JOINT CONTROL OF A CLUTCH AND ELECTRICAL SWITCHES

CROSS-REFERENCES TO RELATED APPLICATION

The present invention is an improvement over U.S. Pat. No. 3,174,450, for "Sewing Machines" of Mar. 23, 1965, having a common assignee and a common co-inventor, but is not limited thereto.

1. Field of The Invention

The present invention includes clutches and similar mechanisms involving the joint control of the application and transmission of power to a plurality of devices, wherein a clutch is actuated mechanically and other devices are actuated electrically. Tie rods, operating the clutch, actuate interrelated power-delivery controls to electrical switches in preselected time intervals.

2. Description of the Prior Art

Clutch motors are employed for driving machine tools and textile machines. They comprise a main clutch by means of which the driven component can be coupled either with the flywheel of the motor, which flywheel rotates constantly at a high speed of rotation, or with a braking block. In conventional motors, the main clutch can be operated by way of a tie rod system engaging a draw lever, this tie rod system being connected with an actuating element, generally a foot pedal. Auxiliary devices are often connected to such coupling motors, for example, one or several electrically operated auxiliary clutches; these auxiliary clutches make it possible to drive the apparatus connected with the coupling motor at one or several lower speeds. Further examples of such auxiliary devices are setting switches which make it possible to arrest the drive in preselectable angular positions of the operating shaft of the machine. The auxiliary devices can also be attachments to the machine, fulfilling auxiliary functions, such as adjustment of the sewing foot and cutting of the thread in case of industrial sewing machines.

It is known to operate these auxiliary devices by means of electrical switches attached to the foot pedal and which can be switched individually, for example, by separately depressible portions of the pedal. However, the operation of the individual switches via foot contacts at the pedal represents a great burden for the person operating the machine. The operator tends to tire prematurely, and it is also possible that the wrong switches are erroneously actuated.

SUMMARY OF THE INVENTION

The invention is based particularly on the objective to simplify the operation of the additional switches, in conjunction with the actuation of the mechanically operable main clutch of the coupling motor.

This objective is attained, in accordance with the invention, in an apparatus for controlling a coupling motor with a main clutch mechanically operable via a tie rod system, and with one or several electrically operable auxiliary devices, by incorporating the electrical switching device serving for operating the auxiliary devices into the tie rod system of the main clutch and making this switching device actuatable by means of this tie rod system. Thereby, it becomes possible to effect the mechanical shifting of the main clutch and the operation of the auxiliary devices by way of a single, common control mechanism, generally a conventional foot pedal. In this way, the operator need not lift his foot off the pedal, which means a substantial facilitation and simplification of the operating of the machine.

Preferably, the tie rod system is provided with two tie rods coupled with each other by means of followers; one of these tie rods is connected with the draw lever of the mechanically operable main clutch, and the other tie rod is connected with an actuating element, preferably a foot pedal. This electrical switching device is mounted to one of the two tie rods and is actuatable on the basis of a relative motion of the two tie rods. The arrangement can be such, in this connection, that, upon a relative motion of the two tie rods in one direction, the draw lever of the main clutch is operable, and upon a relative motion of the two tie rods in the other direction, the electrical switching device is actuatable. This embodiment is suitable for cases wherein the main clutch and the auxiliary devices are to be operable completely independently of one another. According to a modified embodiment, it is also possible to make the electrical switching device and the draw lever of the main clutch operable successively upon one relative movement of the two tie rods. Such an arrangement is preferable when the switching of the main clutch is to be preceded, or followed, in each case, by an actuation of the auxiliary devices.

If it is important that certain non-operative periods are provided before the operation of the main clutch and/or of the auxiliary devices, particularly in order to ensure a certain period between the actuation of the main clutch and the operation of the auxiliary devices, or vice versa, the tie rods are suitably displaceable between the predetermined rest position and the operating position of the draw lever or the electrical switching device and/or between the operating positions of the draw lever and the electrical switching device without effect upon the draw lever or upon the electrical switching device; this displacement of the tie rods is predetermined as to its extent.

Advantageously, the followers are stops which are connected with respectively one of the two tie rods and are provided with a bore through which the other tie rod is extended in a freely movable manner. Thus, the two tie rods can be guided by means of the engaging pieces simply and in a plane-parallel way.

Preferably, the stops are adjustably mounted on the respective tie rod. Thereby, the movement of the tie rods can be limited in the desired manner and/or the non-operative period before, or between the operation of the main clutch and/or the auxiliary devices can be controlled.

The switching device suitably comprises several microswitches which are all connected to one of the tie rods; these microswitches are operable by means of a connecting switch bridge coupled with the other tie rod, so that they are actuated successively. In this manner, several auxiliary devices can be made effective in the desired succession.

The connecting switch bridge can be maintained at a spacing from the microswitches in the rest position, by means of a pretensioned spring, so that the switching device has the effect of a pressure switch. The connecting switch bridge can, however, also be resiliently pressed against the microswitches in the rest position, so that the switching device operates as a pull switch.

Other objects and many of the attendant advantages of this invention will be readily appreciated as the same becomes better understood by reference to the following detailed description when considered in connection with the accompanying drawings in which like numerals designate like or equivalent parts throughout the figures thereof.

BRIEF DESCRIPTION OF THE DRAWINGS

FIG. 5 illustrates the integration of the apparatus with a sewing machine.

DESCRIPTION OF THE PREFERRED EMBODIMENTS

Figure 1:
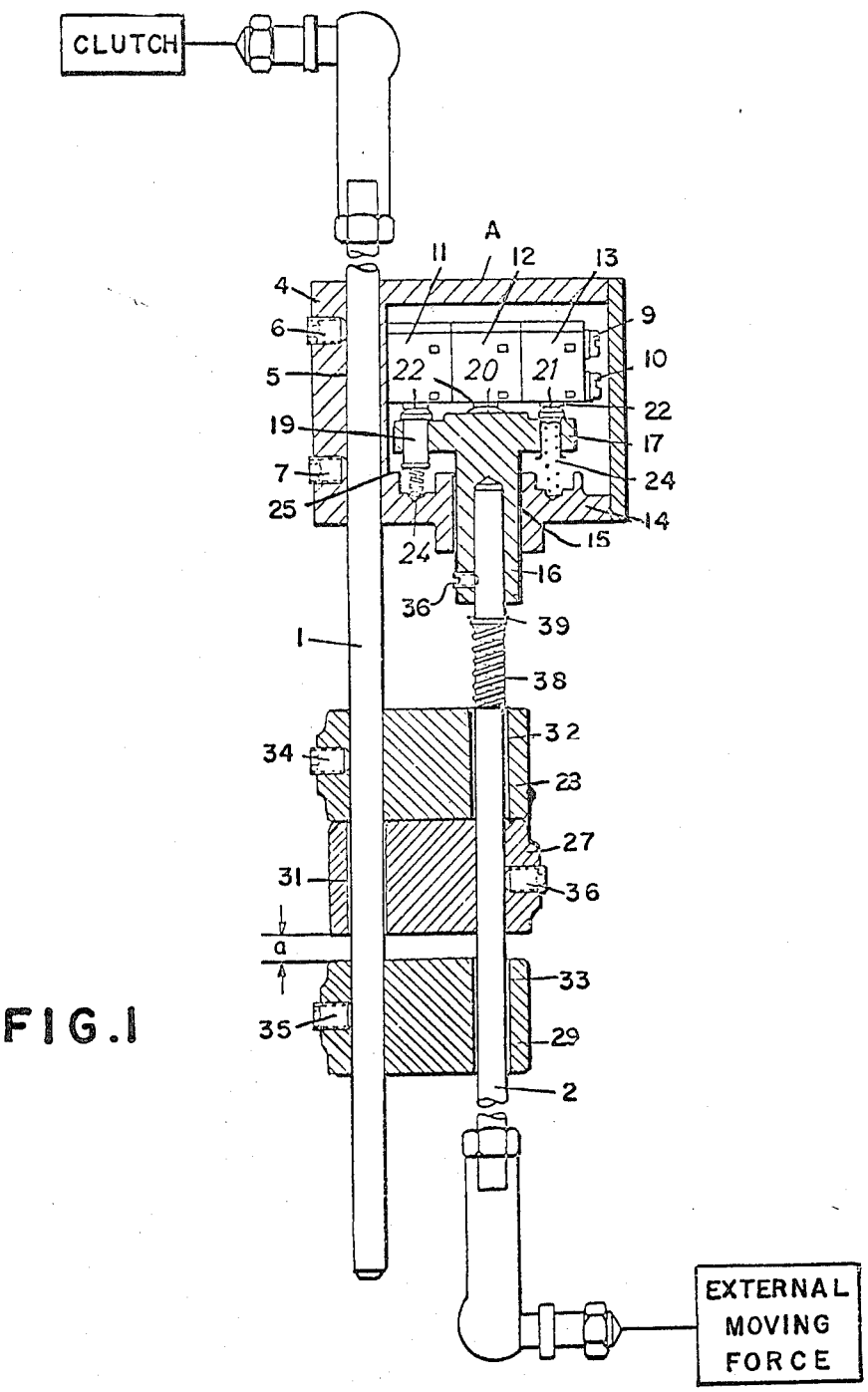
FIG. 1 shows in cross-section a control device according to the present invention with an electrical pull switch.

As illustrated in FIG. 1, the tie rod system connecting the draw lever of the coupling motor with the operating element, preferably a foot pedal, comprises two tie rods 1, 2. The upper end of the tie rod 1 is connectable to the clutch lever of the coupling motor; the lower end of the tie rod 2 can be connected to the foot pedal.

The electrical switching device serving for actuating the auxiliary devices, the latter being illustrated in FIG. 5, is provided with a housing 4 having an axial bore 5 extending all the way therethrough, the tie rod 1 being guide in this bore. Screws, 6, 7 fixedly mount the housing 4 with respect to the tie rod 1. Three microswitches 11, 12, 13 are provided side-by-side in the housing 4 by means of screws 9, 10. The bottom wall 14 of the housing 4 is provided with bore 15 in parallel with bore 5; the stub 16 of connecting switch 17 is guided in the bore 15 in parallel with the tie rod 1, in a displaceable manner.

The connecting switch bridge 17 carries three trip cams 19, 20, 21 which are displaceable in corresponding axial bores of the connecting switch bridge 17 and are mounted flush with the actuating pins (terminals) 22 of the microswitches 11, 12, 13. Helical springs 24, resting against the upper face of the bottom wall 14, press the trip cams 19, 20, 21 in the direction toward the actuating pins 22 of the microswitches. The trip cams have differing axial lengths and are provided, at their lower ends, with a laterally projecting flange 25.

The tie rod 2 is movably inserted, with its upper end, in a central bore of the stub 16 of the connecting switch bridge 17. This tie rod carries a stop 27 axially displaceable between stops 28, 29 of the tie rod 1. In a bore 31 of the stop 27, the tie rod 1 is guided in an axially movable manner. The tie rod 2 extends, with a play, through axial bores 32, 33 of the stops 28, 29. After loosening the screws 34, 35, the stops 28 29 on the tie rod 1 can be adjusted in the axial direction, and the same can be done with stop 27 on the tie rod 2 after loosening the screw 36. A helical spring 38 pushed over the tie rod 2 rests, with its lower end, on the upper face of the stop 28 and abuts, with its upper end, against spring ring 39 fixedly mounted on the tie rod 2. In the rest position, this helical spring 38 maintains the trip cams 19, 20, 21 in engagement with the actuating pins 22 of the microswitches 11, 12, 13.

The above-described device operates as follows: In the rest position, the structural components assume the position shown in FIG. 1. If, now, by actuation of the foot pedal, the tie rod 2 is moved downwardly, the connecting switch bridge 17 is moved, against the force of spring 38, downwardly with respect to the tie rod 1 and the housing 4 connected with the latter. During this process, the flanges 25 of the trip cams 19, 20, 21 successively engage the underside of the connecting switch bridge 17, so that the trip cams are likewise pulled downwardly against the force of the spring 24 and vacate, in succession resulting from their differing axial lengths the actuating pins of the microswitches 11, 12, 13. After traveling the distance a, the underside of the stop 27 meets the upper face of the stop 29; via these two stops, the tie rod 1 is entrained in order to actuate the clutch lever of the coupling motor.

The microswitches 11, 12, 13 can be inserted, for example, in the circuit of electrically operable auxiliary clutches by means of which a machine connected with the coupling motor, for example, a sewing machine, can be driven at a varying number of revolutions. In such a case, it is then possible, in the above-described manner, to make auxiliary clutches effective for a stepwise increasing speed of rotation, before actuating the main clutch by pulling the draw lever of the coupling motor.

The motions of the control device take place in the reverse succession upon expansion of spring 38 when the foot pedal is released. The stop 28 limits the upward movement of the tie rod 2 with respect to the tie rod 1. By means of the bores 31, 32, 33 of the stops 27, 28, 29, the tie rods are constantly guided in a plane-parallel manner with respect to each other.

Figure 2:
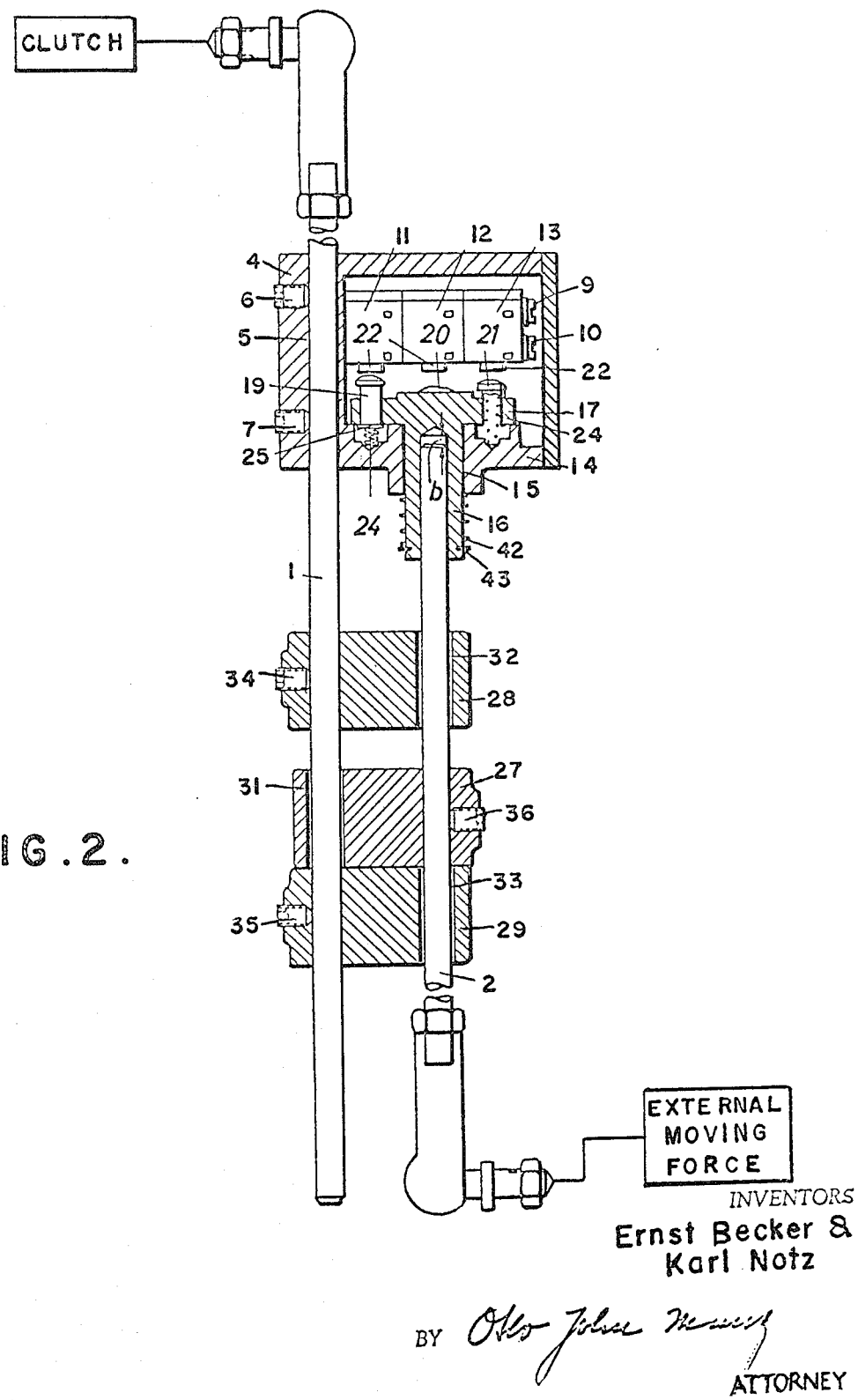
FIG. 2 shows a modified embodiment of the invention with an electrical pressure switch.
Figure 3:
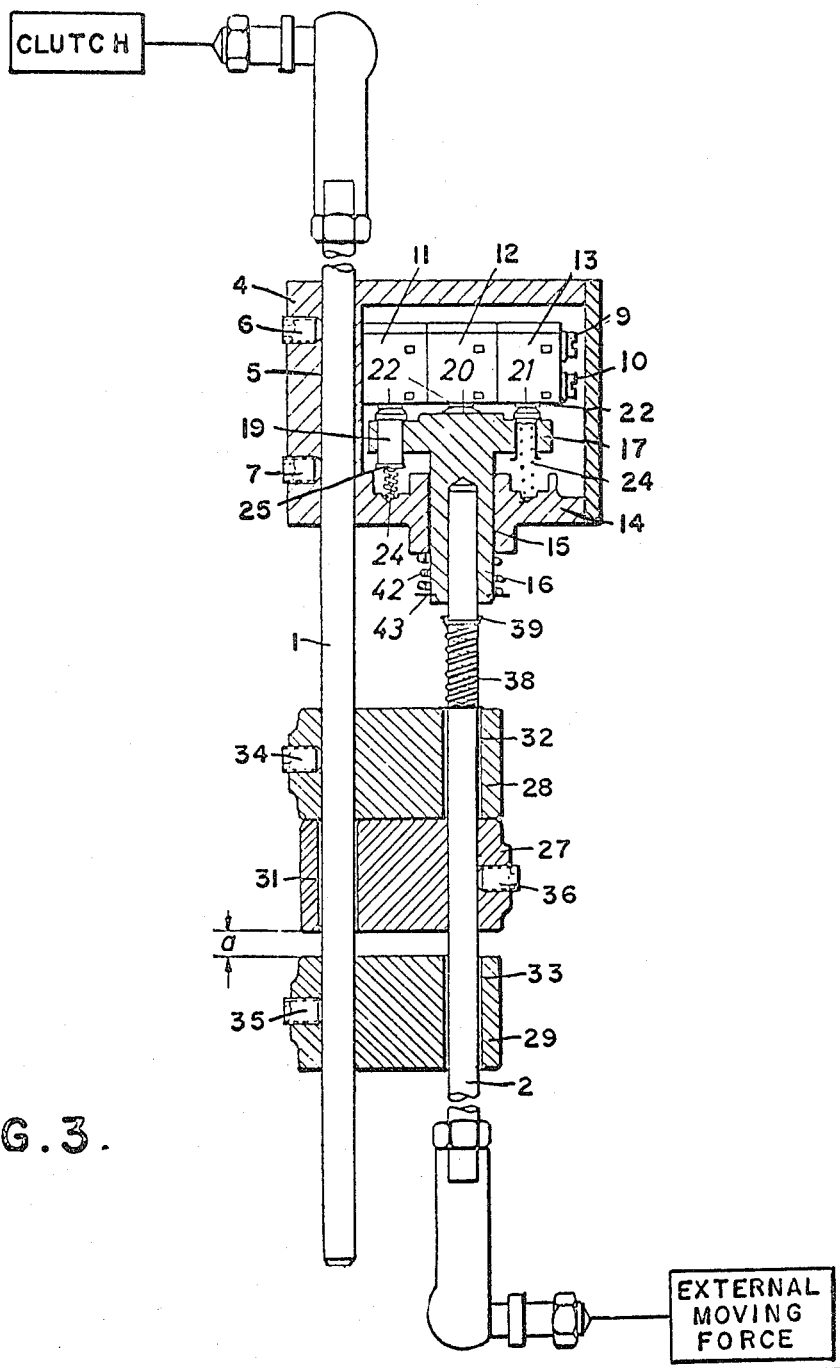
FIG. 3 is a view similar to that of FIG. 1 showing additional spring bias means 42, 43 and an integral connection between the clutch tie-rod 1 and the control switch bridge means 17.

Freedom in the choice of the distance a, i.e., the spacing between stops 27 and 29 as shown in FIG. 2 in the rest position of the device of FIG. 1, is attained, according to the preferred embodiment of this invention in FIGS. 1, 2, and 3 by guiding the upper end of the tie rod 2 displaceably in the central bore of the stub 16 of the connecting switch bridge 17, and by attaching, onto the end of the stub 16 projecting underneath the bottom wall 14 a helical spring 42, one end of this spring engaging the underside of the bottom wall 14, and the other end abutting a spring ring 43, at the lower end of the stub 16. The spring 42 is stronger than the three springs 24 of the trip cams 19, 21, but weaker than the spring 38. Therefore, in the rest position, the spring 38 presses the tie rod 2 upwardly to such an extent that the upper front face of the tie rod 2 abuts the bottom of the central bore of the stub 16 of the connecting switch bridge 17, the connecting switch bridge 17 is entrained upwardly against the force of the spring 42, and the trip cams 19, 20, 21 are effective upon the actuating pins 22 of the microswitches 11, 12, 13. If, now, by the means of the foot pedal, the tie rod 2 is pulled downwardly against the force of the spring 38, the spring 42 carries the connecting switch bridge 17 along until the underside of the connecting switch engages the upper face of the bottom wall 14. During this procedure, the microswitches 11, 12, 13 are successively actuated in the above described manner. On account of the relative movability of the tie rod 2 and the connecting switch 17, the distance a, if desired, can be selected to be larger than the maximum switching path of the connecting switch 17.

The embodiment of FIG. 2 corresponds substantially to that of FIG. 1 with respect to construction and function. It differs from the embodiment of FIG. 1 essentially only in that the electrical switching device, instead of being a pull switch, is a pressure switch. For this purpose, the spring 38 is omitted, and in each case the helical spring 42 with the spring ring 43 pertaining thereto is provided The spring 42 retains, in the rest position illustrated in FIG. 2, the connecting switch 17 against the force of the springs 24, in engagement with the upper face of the bottom wall 14. In this position, the stop 27 of the tie rod 2 rests at the stop 29 of the tie rod 1.

When the tie rod 2 is pulled downwardly by actuating the foot pedal, the tie rod 1 is entrained via the stops 27, 29, and the main clutch of the coupling motor is engaged. After releasing the foot pedal, the main clutch is again disengaged, and the machine is stopped, for example, in a predetermined angular position, in a conventional manner. If auxiliary devices, in a sewing machine for example a pressure foot adjusting and thread cutting device, are to be actuated, it is only necessary to operate the foot pedal in a different direction so that the tie rod 2 slides upwardly against the force of the spring 42. In this process, the trip cams 19, 20, 21 of the connecting switch bridge 17 successively engage the actuating pins 22 of the microswitches 11, 12, 13.

If, in this case, a certain time delay is to be ensured between the actuation of the foot pedal and the upward motion of the connecting switch bridge 17, the connecting switch bridge is suitably attached to the upper end of the tie rod 2 in a displaceable manner, and a certain distance b (see FIG. 2) is maintained in the rest position between the upper front face of the tie rod 2 and the bottom of the bore 15 of the stub 16. Consequently, the tie rod 1 passes through a free space corresponding to the spacing b before the connecting switch bridge 17 is entrained.

For reasons stemming from the manner in which the device is manufactured, it can be advantageous to provide, in place of the trip cams 19, 20, 21 of different axial lengths, corresponding trip cams having identical axial lengths and to have these trip cams cooperate with actuating pins or levers which are analogous to the actuating pins 22, but project downwardly for differing distances within the housing 4. Elements 44 are adjustment means permitting length adjustment of the apparatus, to accommodate manufacturing and assembly variations of the machines in which the invention is used.

It is to be understood that the invention is not limited to the use of three microswitches; rather, depending upon the particular requirements, more or less microswitches can be provided. Furthermore, it is possible, for example, depending upon the particular application of the device, to provide simple contacts in place of the microswitches 11, 12, 13, which cooperate with the trip cams of the connecting switch bridge 17. In this connection, the trip cams can, if desired, be themselves inserted in the switching circuit of the auxiliary devices and can be connected to ground, for example.

The application, transmission and control of the external moving forces may be multiplied by additional means, identical with or similar to those explained above in detail.

Figure 4:
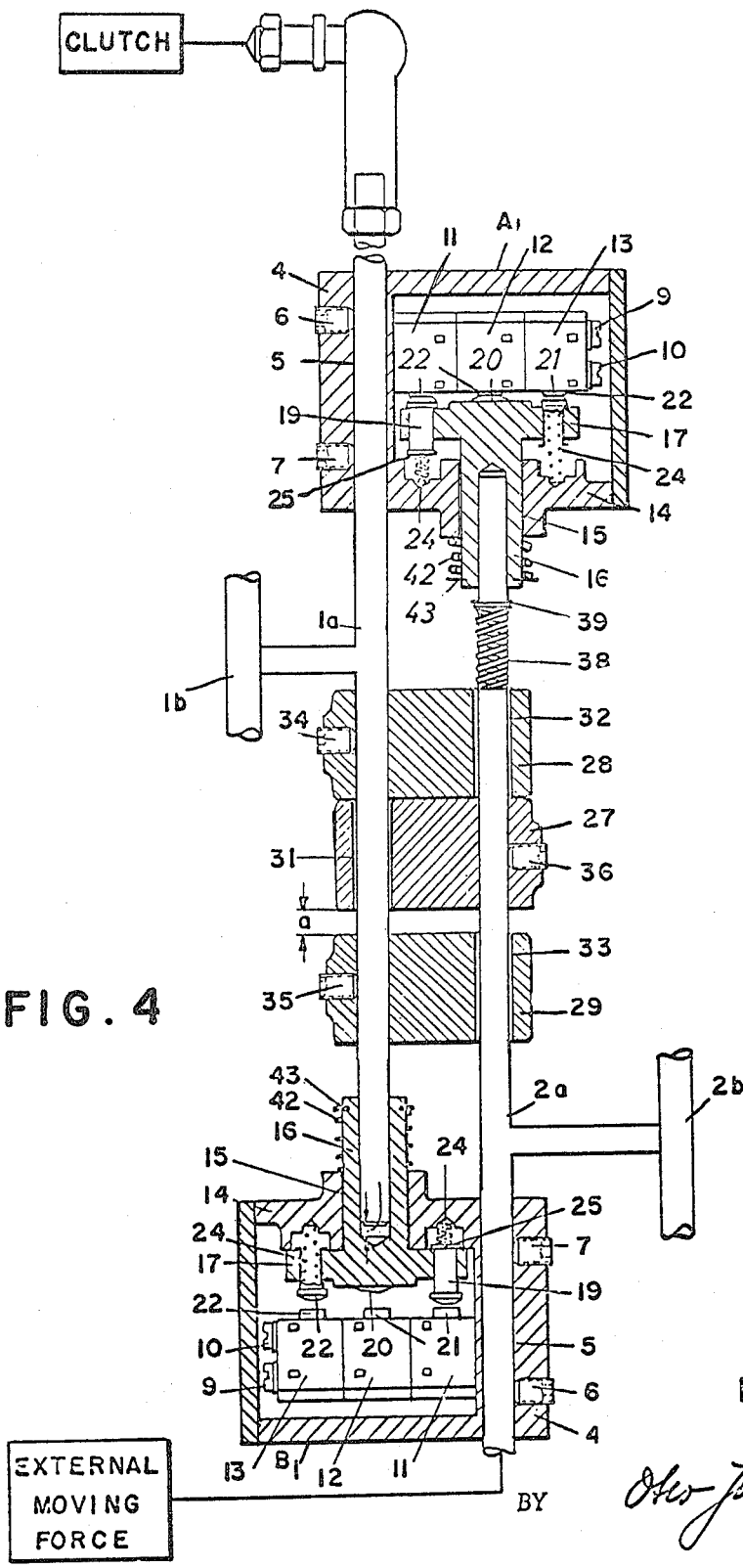
FIG. 4 shows additional improvements illustrating the tandem arrangement of the device.

The electrical switch means A (see FIG. 1) for instance may be coupled to the second tie rod 2 and accompanied by or substituted by identical or similar electrical switch means B (see FIG. 4), coupled to the first tie rod 1, whereby additional interrelated power delivery controls are obtained which may be preset for functions correlated with, synchronous, in reverse or independently of the switch means A. This is shown in FIG. 4.

Additional simultaneous automatic controls may be provided by adding to the tie rods parallel extensions, integrally connected thereto, $1_a$, $1_b$, $2_a$, $2_b$, each of which having a switch means $A_1$, $A_2$ and/or $B_1$, $B_2$.

While various objectives may be served by the present invention, it is expressly within the scope of the present application and without limitations thereto to combine it and claim it with the apparatus, described in applicant's U.S. Pat. No. 3,174,450 by substituting therein for the controls 23 and means operated therewith in FIGS. 1, 2, 3 and 4 the features of the present invention, and the respective portions of that disclosure are to be incorporated herein by reference.

It should be understood, of course, that the foregoing disclosure relates only to preferred embodiments of the invention and that it is intended to cover all changes and modifications of the examples of the invention herein chosen for the purposes of the disclosure, as well as all combinations of the disclosure with that of U.S. Pat. No. 3,174,450, which do not constitute departures from the spirit and scope of the invention set forth in the appended claims.

We claim:

1. A device for operating a clutch mechanism and automatically therewith a plurality of electrically operated additional mechanisms, comprising straight-parallel adjustable mechanical linkage means having two parallel tie-rods with one end connected to said clutch mechanism and with its other end operated by external moving forces;

a electrical of switch actuating means;

an electrcal switch means for each of said additional mechanisms;

said switch actuating means and said linkage means being mechanically adjustably connected with said switch means, said mechanical linkage means comprising a clutch tie rod means operably connected to said clutch mechanism and an external force tie rod means operated by said external forces, and a lost motion means linking the two tie rod means for relative parallel and combined movement therebetween; said switch means being fixedly mounted to one of said tie rod means and said switch actuating means being connected to the other of said tie rods, said switch means and said actuating means being successively actuated.

2. A device as claimed in claim 1, having a compression mode and a tension mode, when in the compression mode is functional in relation to the said clutch mechanism and is functional relative to the electrical switch means when in the compression mode.

3. A device as claimed in claim 1, with relative movement of said two tie rods being alternately in a compression mode and tension mode, being alternately and successively functional in relation to said clutch mechanism and said electrical switch means.

4. A device as claimed in claim 2, actuation of said clutch mechanism being spaced in time from the actuation of said switch means.

5. A device as claimed in claim 1, said lost motion means being three stops connected successively to one of the two tie rod means, each stop provided with a bore through which the other tie rod passes, freely movably therein.

6. A device as claimed in claim 5, said stops being adjustably mounted along the tie rods.

7. A device as claimed in claim 1, said switch means including a plurality of microswitches all connected with one of said tie rods.

8. A device as claimed in claim 7, further comprising a connecting switch bridge coupled to the other tie rod and means to operate said microswitches successively by movement of said connecting switch bridge.

9. A device as claimed in claim 8, further comprising a spring means to bias said connecting switch bridge away from said microswitches.

10. A device as claimed in claim 8, further comprising resilient means to bias said connecting switch bridge toward said microswitches.

11. A mechanism including a device for operating a clutch mechanism and automatically therewith a plurality of electrically operated additional mechanisms, comprising straight-parallel adjustable mechanical linkage means having two parallel tie rods with one end connected to said clutch mechanism and with its other end operated by external moving forces;

a plurality of switch actuating means;

an electrical switch means for each of said additional mechanisms;

said switch actuating means and said linkage means being mechanically adjustably connected with said switch means, further comprising a textile machine such as a sewing machine provided with a shaft and including principal drive means, said clutch mechanism mounted therein; auxiliary drive means containing said clutch mechanism, said linkage means selectively and operatively connecting said shaft with said principal drive means or said auxiliary drive means; a control system to stop said machine in a predetermined angular position of said shaft, said control system comprising synchronizing means, said switch means operative to close upon actuation of said linkage means establishing an operative connection of said shaft with said principal drive means and operative to open upon disengagement of said shaft from said principal drive means, means to start said auxiliary drive means upon establishing the operative connection by said linkage means of said shaft with said principal drive means, including circuit means containing said switch means, said synchronizing means connected in parallel with said switch means, said switch means energizing said circuit means for starting said auxiliary drive means, and disconnect means in said circuit means to switch off and said machine in dependence on the rotary speed of said shaft.

* * * * *